UNITED STATES PATENT OFFICE 2,583,980

UNSATURATED DIESTERS OF HYDRAZODICARBONIC ACID AND POLYMERS THEREOF

Lynwood N. Whitehill, Berkeley, Calif., and William M. McLamore, Cambridge, Mass., assignors to Shell Development Company, San Francisco, Calif., a corporation of Delaware No Drawing. Application January 22, 1946,
Serial No. 642,746

10 Claims. (Cl. 260—77.5)

This invention relates to a class of polymerizable compounds and to the polymers thereof. The compounds are unsaturated diesters of hydrazodicarbonic acid. Hydrazodicarbonic acid has the formula

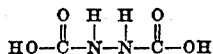

The esters are compounds wherein the hydrogen atoms of both carboxyl groups of the acid have been replaced by the radical of a monohydric alcohol of 2 to 18 carbon atoms which contains an olefinic linkage therein such as is the case with vinyl, allyl, cinnamyl, and oleyl radicals, for example. These compounds form polymers with very useful properties by addition polymerization through the olefinic groups contained therein. A particularly suitable group of compounds of the invention with excellent polymerization properties are the N,N' dicarboalkenyloxy hydrazines having the alkenyloxy groups of 2 to 18 carbon atoms with an olefinic bond attached to the second carbon atom from the oxygen atom therein. This subgroup has the olefinic double bond in the alkenyl radicals in the same structural position as it is present in vinyl or allyl radicals. A more preferred subgroup are the N,N' dicarboalkenyloxy hydrazines having alkenyloxy groups of 3 to 10 carbon atoms and an olefinic linkage between the second and third carbon atoms from the oxygen atom therein. Such esters contain allyl-type radicals, of which allyl, methallyl, crotyl and methyl vinyl carbinyl are typical. The most preferred compounds of the invention are three lower members of the class, namely, N,N' dicarbovinyloxy hydrazine, N,N' dicarboallyloxy hydrazine and N,N' dicarbomethalloxy hydrazine.

The compounds are prepared by reacting the appropriate unsaturated chloroformate, such as allyl chloroformate or vinyl chloroformate, with hydrazine. The chloroformates are prepared by the now known fashion of reacting the unsaturated alcohol with phosgene. In this manner, chloroformates can be prepared from such alcohols as allyl, methallyl, crotyl, ethallyl, tiglyl, angellyl, methyl vinyl carbinyl, ethyl vinyl carbinyl, dimethyl vinyl carbinyl, methyl allyl carbinyl, cinnamyl, citronellyl, geranyl, ethyl isobutenyl carbinyl, 2,4-hexadiene-yl-1, and hexenyl-1, as well as higher alcohols including oleyl and linoleyl alcohols, or the unsaturated alcohols derived from China-wood oils or other drying oils, or the substituted alcohols such as 2-chloroallyl, 2-bromoallyl, chlorocrotyl 3-chlorobuten-2-ol-1, or other halogen substituted alcohols. When the alcohols do not exist as such in the free state, e. g. vinyl alcohol, and it is desired to use a chloroformate having the chloroformic radical linked directly to an olefinic carbon atom, such chloroformates can be prepared according to the methods now described in U. S. Patent No. 2,377,085 which is suitable for obtaining reactants such as vinyl, propenyl, isopropenyl, isocrotyl, 1-pentyl-1, 1-octenyl-1, 1-dodecenyl-1, 2-hexenyl-2, 3-tetradecenyl-4, 1-phenyl-2-propenyl-1, 3 - naphthyl-2-butenyl-2 and like chloroformates.

The reaction of the hydrazine with the unsaturated chloroformate is assisted by having a basic substance present during the reaction which will combine with the hydrochloric acid liberated by the reaction such as organic bases like pyridine, dimethylaniline and quaternary ammonium bases such as trimethyl phenylammonium hydroxide, or inorganic bases such as hydroxides, carbonates or bicarbonates of alkali or alkaline earth metals like sodium, potassium, calcium, barium, strontium or magnesium. The alkaline agent may be in solution or may be dispersed in the reaction mixture as a finely divided solid. Diluents or solvents are convenient to have present in the reaction mixture and for this purpose water, benzene, carbon tetrachloride or dioxane may be used.

In effecting the reaction the hydrazine is placed in the reaction vessel and the unsaturated chloroformate along with basic agent are separately added gradually and simultaneously over a period of time. Ordinarily atmospheric temperatures of 15 to 30° C. are usually suitable for use in obtaining the desired reaction. In some cases it may be desirable to apply refrigeration in order to cool the reaction mixture during the reaction, and in some cases higher temperatures, e. g. 50 to 150° C. give better results. After completing the addition of the unsaturated chloroformate to the reaction mixture, it is ordinarily preferred to heat the mixture at say boiling temperature so as to assure completion of the reaction.

When an aqueous reaction medium is used the hydrazine is conveniently employed in the form of its dihydrochloride salt, although hydrazine hydrate may also be used if desired. Free hydrazine can be used when a non-aqueous reaction medium is employed. Vinyl chloroformate hydrolyzes easily and in making the vinyl esters, it is ordinarily desirable to use a non-aqueous reaction mixture.

The esters can be recovered from the reaction mixture usually by crystallization after cooling the same. Purification of the crude esters is conveniently accomplished by dissolving the ester in a suitable solvent such as an aqueous mixture of isopropyl alcohol wherein the ester will be soluble when the solvent mixture is heated to around 70° C., but upon the cooling to room temperature or lower the desired ester can be crystallized and filtered from the solvent. Although crystallization is a preferred method for recovering the esters, some of the lower boiling members can be recovered by distillation, preferably in vacuo. Decolorization of the esters can be effected by dissolving them in a suitable solvent such as isopropyl alcohol or benzene and subjecting the solution while hot to the action of activated charcoal.

The majority of the esters of the invention are crystalline solids at room temperature (20° C.), although some of them having highly branched chains will be liquids at this temperature. The esters are very valuable materials in that polymers can be prepared from them having varying properties depending upon the degree of extent of polymerization. If the esters are substantially completely polymerized they form polymers which are infusible and insoluble in all organic solvents, acids and alkalies. Even though such polymers of the esters of the invention contain a nitrogen-to-nitrogen bond therein, the lower members give polymers having remarkable properties of strength and toughness. Furthermore, the compounds polymerize very rapidly and have excellent color stability when exposed to light even though they contain a hydrazo group which usually precludes such property, i. e. many polymers of amino compounds are subject to rapid discoloration upon exposure to light.

While the esters of the invention can be used as solvents, plasticizers, and softeners for resins and synthetic or natural rubber, the most important use of them is for the production of resinous polymers. The esters are polymerized by the use of heat alone or more preferably by heating in the presence of a polymerization catalyst. The various oxygen-yielding polymerization catalysts are suitable for this purpose such as benzoyl peroxide, acetyl peroxide, benzoyl acetyl peroxide, lauryl peroxide, dibutyl peroxide, succinyl peroxide, sodium peroxide, barium peroxide, tertiary alkyl hydroperoxides such as tertiary butyl hydroperoxide, peracetic acid, perphthalic acid, perborates, persulfates, ozone, air and oxygen. The esters can be polymerized also in the presence of their own peroxides or their ozonides. Another class of polymerization catalysts is the di (tertiary alkyl) peroxides, notably di (tertiary butyl) peroxide as described and claimed in the copending application of Vaughan and Rust, Serial No. 510,420, filed November 15, 1943, which matured as Patent No. 2,403,771 on July 9, 1946. If desired, mixtures of polymerization catalyst can be used, a suitable mixture being that of benzoyl peroxide and di-tertiary butyl peroxide as described and claimed in copending application, Serial No. 572,086, filed January 9, 1945, now abandoned. In some cases, it may be desirable to conduct the polymerization in the concurrent presence of both a catalyst and an inhibitor of polymerization. The amount of catalyst used will ordinarily be between about 0.01% and about 5%, although it is not necessarily limited to this range. In still other cases, it may be desirable to use no other agent to effect polymerization than heat. Polymerization is usually energized by the application of heat although both heat and light may be used together and in some cases light alone is sufficient. Temperatures between about 60° C. and 150° C. are preferred, although higher and lower temperatures can be used.

Like other diallyl and related esters, the compounds of the invention polymerize through three successive stages. Upon polymerizing a composition consisting of the ester, the soluble and fusible form of the polymer is first produced. This first polymer is ordinarily obtained in admixture with unpolymerized monomeric ester. It can be separated from the monomer by usual procedures and it is characterized by being soluble in many common organic solvents including its monomer. At ordinary atmospheric temperatures this form of the polymer is either a viscous liquid or a soft solid, but it can be rendered flowable by heating. The soluble and fusible polymer is capable of being further polymerized either alone or as it forms in admixture with the monomer. Upon being further polymerized, the fusible polymer changes to a gel form which is insoluble in the common organic solvents including its monomer. Nevertheless, the insoluble gel is fusible and upon heating is rendered flowable. Both the soluble polymer and the fusible gel polymer are valuable materials for the usual resin molding operations effected under heat and pressure to form shaped articles because they still further polymerize to the final stage. This final form of the polymer is insoluble in common organic solvents as well as being infusible. Upon heating the infusible polymer at increasing temperatures, it finally reaches a temperature at which it decomposes, but intermediate between that temperature and room temperature, it does not become fusible or flowable although it may soften slightly so as to be capable of being bent or curved somewhat without breaking upon application of stress. The esters of the invention are thus seen to be thermosetting, resin-forming compounds and they pass through the three successive stages of polymerization to form first soluble polymer, then insoluble gel polymer and finally infusible polymer. While the intermediate polymeric forms can be obtained by interrupting the polymerization at a desired stage with separation of the polymer in the usual manner, the esters can be polymerized through to the final stage without interruption if desired. The interruption of the polymerization of the esters provides valuble materials for further processes. Incomplete polymerization can be used for the production of a syrup comprising a mixture of a monomer and fusible polymer which may be further worked and eventually substantially completely polymerized. The syrup may for instance be transferred to mold of any desired configuration and again subjected to polymerization conditions or it may be used in coating operations or in impregnating bibulous materials, such as paper, fabrics, etc., which in turn may be used in the production of laminates.

The esters of the invention are particularly suited for cast polymerization wherein the monomeric ester is polymerized through to the infusible polymer in one operation. Cast sheets or rods of the homopolymers are obtained in this manner. When 1% to 5% benzoyl peroxide is employed, the allyl esters completely polymerize at 90° C. in about 144 hours to a hard, tough resin. Longer or shorter times may be necessary or desirable with other particular esters. It is sometimes desirable to effect the polymerization over a schedule involving varying or increasing temperatures. Excellent results are obtained with the allyl esters by polymerizing with 2% benzoyl peroxide and heating 2 hours at 90° C., then heating at 105° C. for 1 hour, and completing the curing at 115° C. for an additional 3 hours.

Although particular emphasis has been made in the foregoing description with respect to homopolymers of the esters, the compounds can be mixed with other polymerizable compounds and the mixture subjected to the polymerizing conditions whereby copolymers are produced. Copolymers with modified properties from the homopolymers are obtainable by varying the amount and/or kind of copolymerizable compound mixed with the esters. Any compound capable of addition polymerization is suitable for preparation of the copolymers such as those containing the

or vinylidene group like styrene, methyl styrene, butadiene-1,3, isoprene, cyclopentadiene, vinyl acetate, diallyl phthalate, methyl methacrylate, diallyl diglycolate, allyl acetate, crotyl stearate, ethylacrylate, methyl vinyl ketone, methyl isopropenyl ketone, acrolein, methacrolein, acrylonitrile, etc. The proportion of copolymerizable compound in admixture with the unsaturated ester of hydrazodicarbonic acid can vary over wide limits as from 1 to 99%. If desired, two or more different copolymerizable compounds can be copolymerized with the ester. In some cases it is desirable to copolymerize two or more different unsaturated esters of hydrazodicarbonic acid.

For the purpose of illustrating one of the methods of preparing the esters of the invention and the properties of a typical member of the class, the following example is given wherein the parts are by weight.

EXAMPLE

About 52.5 parts of hydrazine dihydrochloride was dissolved in 300 parts of water. To this solution, which was cooled to 10 to 20° C., was separately added, slowly and simultaneously, a solution of 80 parts of sodium hydroxide in 250 parts of water, and 120.5 parts of allyl chloroformate. After the addition was complete, the reaction mixture was allowed to stand for about 15 hours and the reaction mixture was then warmed nearly to boiling for about 40 minutes, cooled and the precipitated material filtered off.

The precipitate was the crude ester. After air drying, it melted at 74 to 76° C. About 98 parts were obtained indicating a conversion of approximately 98%. The N, N' dicarboallyloxy hydrazine was decolorized by dissolving in a boiling aqueous solution of isopropyl alcohol to which activated charcoal was added and filtering while hot, after which the solution was cooled to crystallize the ester. This treatment gave about 76.5 parts of white crystals melting at 85 to 86° C. Concentration of the mother liquors yielded about 5 parts more. Analysis of the recrystallized material gave 13.8 and 13.9% nitrogen while the theoretical value is 14.0%.

The N,N' dicarboallyloxy hydrazine was cast polymerized in the presence of 0.5% of tertiary butyl perbenzoate by heating at 90° C. for 144 hours, whereby a hard, clear infusible and insoluble polymer was obtained. This polymer was subjected to a number of standard tests for resins, the results of which are given in the table below. For purposes of comparison, cast polymerized diallyl phthalate was also tested, this polymer being one of the allyl ester resins having especially good properties. Also for comparison are listed values on another allyl nitrogen-containing ester, namely, dicarboallyloxy ethanolamine. The last two compounds were polymerized in the presence of 2% benzoyl peroxide by heating at 65° C. for 144 hours.

|  | N,N' Dicarboallyloxy Hydrazine | Dicarboallyloxy Ethanolamine | Diallyl Phthalate |
|---|---|---|---|
| Gelation time, hours | 0.7 | 13.5 | 15.5 |
| Density, 20/4 | 1.330 | 1.315 | 1.273 |
| Refractive Index, 20/D | 1.5255 | 1.5189 | 1.5273 |
| Per cent light transmission at 425 m/μ. original | 86 | 78 | 77 |
| After 7 days southern exposure on roof | 86 | 74 | 68 |
| After 35 days southern exposure on roof | 86 | 68 | 60 |
| Barcol hardness | 55 | 48 | 42 |
| Edgewise compression strength, p. s. i.[1] | 35,900 | 27,700 | 26,500 |
| Per cent deformed at ultimate point | 22.3 | 22.0 | 34 |
| Yield point on compression, p. s. i | 31,600 | 20,200 | 17,000 |
| Per cent deformed at yield point | 7.5 | 6.7 | 6.4 |
| Flexural strength, p. s. i.[2] | 14,200 | 16,500 | 12,400 |
| Modulus in flexure, p. s. i. ×10⁻⁶ | 0.57 | 0.43 | 0.46 |
| Dynstat impact strength, kg. per sq. cm | 14 | 18 | 26 |

[1] A. S. T. M. Method: D695-44T.
[2] A. S. T. M. Method: D791-44T.

The foregoing table shows the ester of the invention gives a polymer having excellent toughness, hardness and strength, as well as unusual stability towards discoloration when exposed to the atmosphere and sunlight.

We claim as our invention:

1. A symmetrical diester of hydrazodicarbonic acid and a monohydric alcohol of 2 to 18 carbon atoms containing an olefinic linkage.

2. A polymer of the compound defined in claim 1.

3. N,N' dicarboalkenyloxy hydrazine having identical alkenyloxy groups of 2 to 18 carbon atoms and the olefinic bond attached to the second carbon atom from the oxygen atom therein.

4. A polymer of the compound defined in claim 3.

5. N,N' dicarboallyloxy hydrazine.

6. A polymer of N,N' dicarboallyloxy hydrazine.

7. N,N' dicarbomethallyloxy hydrazine.

8. A polymer of N,N' dicarbomethallyloxy hydrazine.

9. N,N' dicarbovinyloxy hydrazine.

10. A polymer of N,N' dicarbovinyloxy hydrazine.

10. A polymer of N,N' dicarbovinyloxy hydrazine.

LYNWOOD N. WHITEHILL.
WILLIAM M. McLAMORE.

REFERENCES CITED

The following references are of record in the file of this patent:

UNITED STATES PATENTS

| Number | Name | Date |
|---|---|---|
| 2,384,074 | Chenicek | Sept. 4, 1945 |
| 2,385,911 | Chenicek | Oct. 2, 1945 |
| 2,395,750 | Muskat et al. | Feb. 26, 1946 |

OTHER REFERENCES

Beilstein, "Hand. der Organ. Chem.," vol. IV (2nd Suppl. 4th Ed.), pages 78 to 80.